(12) United States Patent
Goldsmith et al.

(10) Patent No.: US 10,173,930 B2
(45) Date of Patent: Jan. 8, 2019

(54) SINTERED CERAMIC BODIES AND APPLICATIONS THEREOF

(71) Applicant: Kennametal, Inc., Latrobe, PA (US)

(72) Inventors: Jason Goldsmith, Greensburg, PA (US); Sheng Chao, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/641,846

(22) Filed: Jul. 5, 2017

(65) Prior Publication Data

US 2017/0334789 A1    Nov. 23, 2017

Related U.S. Application Data

(62) Division of application No. 15/162,105, filed on May 23, 2016, now Pat. No. 9,845,268.

(51) Int. Cl.
*C04B 35/56* (2006.01)
*B23B 27/14* (2006.01)
*C04B 35/117* (2006.01)
*C04B 35/581* (2006.01)

(52) U.S. Cl.
CPC ........ *C04B 35/5626* (2013.01); *B23B 27/148* (2013.01); *C04B 35/117* (2013.01); *C04B 35/581* (2013.01); *B23B 2224/04* (2013.01); *B23B 2226/18* (2013.01); *C04B 2235/322* (2013.01); *C04B 2235/3206* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3231* (2013.01); *C04B 2235/3244* (2013.01); *C04B 2235/3246* (2013.01); *C04B 2235/3839* (2013.01); *C04B 2235/3847* (2013.01); *C04B 2235/3856* (2013.01); *C04B 2235/3869* (2013.01); *C04B 2235/3886* (2013.01); *C04B 2235/764* (2013.01); *C04B 2235/785* (2013.01); *C04B 2235/786* (2013.01); *C04B 2235/80* (2013.01)

(58) Field of Classification Search
CPC .................. C04B 35/5626; B23B 27/148
See application file for complete search history.

(56) References Cited

U.S. PATENT DOCUMENTS

| | | | |
|---|---|---|---|
| 6,464,747 B2 * | 10/2002 | Enya | C22C 1/051 419/48 |
| 2004/0052593 A1 * | 3/2004 | Anderson | B23B 27/143 407/119 |
| 2009/0068498 A1 * | 3/2009 | Sakumichi | C04B 35/117 428/815.1 |
| 2016/0023952 A1 * | 1/2016 | Moteki | C04B 35/119 501/93 |
| 2017/0334788 A1 | 11/2017 | Goldsmith et al. | |

FOREIGN PATENT DOCUMENTS

| | | |
|---|---|---|
| CA | 2275468 | 10/1998 |
| CA | 2877623 | 11/2015 |
| CA | 2881195 | 3/2018 |
| DE | 102017110163 A1 | 11/2017 |
| JP | 55054543 | * 4/1980 |
| JP | 05279121 | * 10/1993 |
| JP | 201181776 | * 7/2001 |

OTHER PUBLICATIONS

Nov. 24, 2017 Search Report.
Apr. 9, 2018 Office Action.

* cited by examiner

*Primary Examiner* — Karl E Group
(74) *Attorney, Agent, or Firm* — Larry R. Meenan

(57) ABSTRACT

In one aspect, sintered ceramic bodies are described herein which, in some embodiments, demonstrate improved resistance to wear and enhanced cutting lifetimes. For example, a sintered ceramic body comprises tungsten carbide (WC) in an amount of 40-95 weight percent, alumina in an amount of 5-30 weight percent and ditungsten carbide ($W_2C$) in an amount of at least 1 weight percent.

6 Claims, 7 Drawing Sheets

SINTERED CERAMIC BODIES AND APPLICATIONS THEREOF

RELATED APPLICATION DATA

Pursuant to 35 U.S.C. § 120, the present application is a divisional application of U.S. patent application Ser. No. 15/162,105 filed May 23, 2016 now U.S. Pat. No. 9,845,268.

FIELD

The present invention relates to sintered ceramic bodies and, in particular, to sintered ceramic bodies having compositions and properties for metal cutting applications.

BACKGROUND

Cemented carbides are often employed as cutting tool bodies for machining various metals and alloys. Cemented carbides are attractive materials for metal cutting applications since carbide properties can be tailored to specific requirements of the cutting environment. For example, cemented carbides having small grain size and low binder content are suitable for applications requiring high hardness and abrasion resistance. Alternatively, cemented carbides having higher binder content exhibit desirable thermal shock resistance and are generally used in interrupted cut applications.

However, cemented carbides are not suitable for all metal working applications. In some applications, cemented carbides may chemically react with the metal or alloy being machined. Moreover, cemented carbides may be unsuitable for applications requiring high hot hardness and superior heat dispersal resulting from high feed rates and greater depths of cut. For these applications, sintered ceramic compositions are used as cutting tool bodies. Sintered ceramic bodies can exhibit chemical inertness, high abrasion resistance, high hot hardness and superior thermal properties for heat dissipation. Sintered ceramic bodies currently in use are largely based on alumina ($Al_2O_3$) and/or silicon nitride ($Si_3N_4$). Such materials provide enhanced high temperature properties relative to cemented carbides, thereby enabling reduced operating time to a finished part. Nevertheless, improvements to sintered ceramic substrates are necessary to meet the evolving demands of metal working applications, and a careful balance between competing properties is required when making compositional changes to sintered ceramic bodies in efforts to provide cutting tools with improved performance.

SUMMARY

In one aspect, sintered ceramic bodies are described herein which demonstrate improved resistance to wear and enhanced cutting lifetimes. For example, a sintered ceramic body, in some embodiments, comprises tungsten carbide (WC) in an amount of 40-95 weight percent, alumina in an amount of 5-30 weight percent and ditungsten carbide ($W_2C$) in an amount of at least 1 weight percent. In some embodiments, $W_2C$ is present in an amount of 1-25 weight percent.

Alternatively, a sintered ceramic body comprises WC in an amount of 40-95 weight percent, alumina in an amount of 1-50 weight percent and one or more compounds comprising titanium and molybdenum (Ti,Mo). (Ti,Mo)-containing compound(s), in some embodiments, are present in the sintered ceramic body a total amount of 0.1 to 20 weight percent. In some embodiments, $W_2C$ is also present in an amount of at least 0.1 weight percent.

In further embodiments, a sintered ceramic body comprises WC in an amount of 40-95 weight percent and aluminum oxynitride (AlON).

As described further herein, the sintered ceramic bodies can be employed in metal cutting applications. Accordingly, the sintered ceramic bodies can have the shape of a metal cutting tool. For example, a sintered ceramic body of composition described herein can comprise a rake face and a flank face intersecting the rake face to form a cutting edge.

These and other embodiments are described in greater detail in the detailed description that follows.

DETAILED DESCRIPTION

Figure 1:
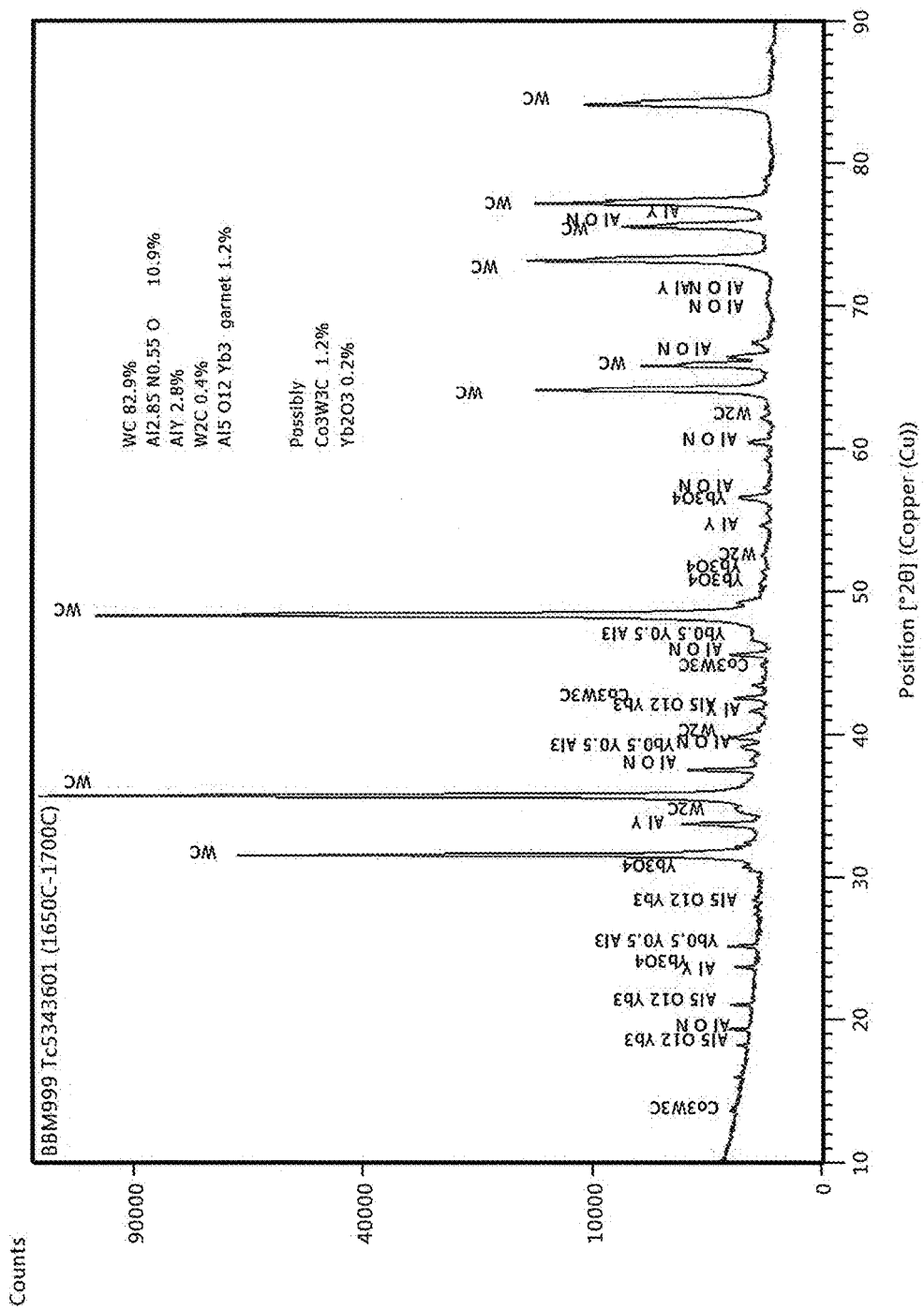
FIG. 1 is an X-ray diffractogram (XRD) of a sintered ceramic body comprising WC and AlON according to one embodiment described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing for the spirit and scope of the invention.

I. $WC-W_2C-Al_2O_3$ Sintered Ceramic Bodies

Sintered ceramic bodies are described herein having desirable properties for metal cutting applications. In one aspect, a sintered ceramic body comprises WC in an amount of 40-95 weight percent, alumina in an amount of 5-30 weight percent and $W_2C$ in an amount of at least 1 weight percent. In some embodiments, $W_2C$ is present in the sintered ceramic body in an amount selected from Table I.

TABLE I

| $W_2C$ Content (wt. %) |
|---|
| 1-25 |
| 1.5-25 |
| 2-25 |
| 5-20 |
| 10-20 |
| 12-18 |
| 3-15 |

Moreover, alumina can be present in the sintered ceramic body in an amount selected from Table II.

TABLE II

| $Al_2O_3$ Content |
|---|
| 15-30 |
| 20-30 |
| 10-20 |
| 5-15 |

Alumina of the sintered ceramic body, in some embodiments, is solely α-alumina. Alternatively, alumina of the sintered ceramic body can include a mixture of polymorphs, such as α+κ. Alumina crystalline phase or structure can be determined according to x-ray diffraction (XRD) analytical techniques.

In some embodiments, the sintered ceramic body further comprises an oxide component including one or more rare-earth elements. For example, the oxide component can include one or more rare-earth elements selected from the group consisting of ytterbium, lanthanum, samarium, dysprosium and erbium. When fabricating the sintered ceramic body, the oxide component can be provided as rare-earth oxide powder, such as $Yb_2O_3$, $La_2O_3$, $Dy_2O_3$, $Sm_2O_3$, $Er_2O_3$ or mixtures thereof. When sintered with the other powder components forming the body (e.g. WC, $W_2C$ and $Al_2O_3$), the oxide component can form mixed oxides. In some embodiments, for example, mixed oxides including rare-earth element(s) and aluminum are formed in the sintering process. Such mixed oxides can include those of the formula $RE_3Al_{15}O_{12}$, wherein RE is one or more rare-earth elements. Mixed oxides of other formulas may form as well. In some embodiments, the oxide component can also include oxides such as $Y_2O_3$ and/or MgO.

The oxide component including one or more rare earth elements can generally be present in the sintered ceramic composition in an amount ranging from 0.1-20 weight percent. In some embodiments, the oxide component is present in an amount of 1-15 weight percent. Additionally, one or more rare earth elements are present in the sintered ceramic body in a total amount of 0.05-3 weight percent. Elemental analysis of the sintered ceramic body can be administered according to several well-known techniques including X-ray fluorescence (XRF) or electron spectroscopy.

The sintered ceramic body can also comprise zirconia. In some embodiments, zirconia includes a stabilizer such as yttria, ceria, magnesia, and/or calcia. In such embodiments, the zirconia can exhibit a tetragonal crystalline structure or a mixture of tetragonal and monoclinic crystalline structures. As with alumina, crystalline structure of the zirconia can be elucidated with XRD techniques. Zirconia can generally be present in the sintered ceramic body in an amount of 0.1-10 weight percent. In some embodiments, zirconia is present in an amount of 0.1-5 weight percent. Further, zirconium (Zr) can be present in the sintered ceramic composition in an amount of 0.05-5 weight percent.

As described further herein, the sintered ceramic body can also comprise one or more Ti-compounds, Mo-compounds or (Ti,Mo)-compounds or mixtures thereof. Such compounds can be carbides, nitrides, carbontrides, oxycarbonitrides or oxides or mixtures thereof. Ti-compounds, Mo-compounds and/or (Ti,Mo)-compounds are generally present in the sintered ceramic body in a total amount of 0.1-20 weight percent. When fabricating the sintered ceramic body, various Ti-containing and/or Mo-containing powders can be incorporated into the body prior to sintering. Suitable powders include, but are not limited to, TiC, TiN, TiCN, MoC, $MoO_3$ and Mo metal. In some embodiments, Mo is present in the sintered ceramic body in an amount of 0.05-5 weight percent. As with other elements in the sintered ceramic body, Mo content can be determined according to XRF or electron spectroscopic techniques.

In some embodiments, the sintered ceramic body may also include an additive component. The additive component can include one or more Group VB metal carbides such as vanadium carbide (VC), tantalum carbide (TaC), niobium carbide (NbC) and/or NbZrC. The additive component, in some embodiments, comprises chromium carbide in addition to or separate from Group VB metal carbides. Chromium carbide included in the sintered ceramic body may be of the formula $Cr_2C_3$ or other formulas The additive component, in some embodiments, is present in the sintered ceramic body in an amount of 0.1-15 weight percent. Individual species of the additive component can be present in amounts selected from Table III.

TABLE III

| Species of Additive Component (wt. %) | |
|---|---|
| Species | Amount |
| VC | 0.05-1 |
| $Cr_2C_3$ | 0.05-1 |
| TaC | 0.05-5 |
| NbC | 0.5-5 |
| ZrNbC | 0.5-5 |

The sintered ceramic body may also include AlON. In some embodiments, AlON is present in an amount of 0.1 to 20 weight percent. In embodiments wherein AlON is present, aluminum nitride (AlN) can be added to the powder mixture during green forming. During sintering of the powder mixture, AlN is partially or fully converted to AlON. Sintering can be administered in a nitrogen atmosphere to facilitate formation of the AlON phase. When partially converted to AlON, AlN can remain a component of the sintered ceramic body. In some embodiments, for example, AlN is present in the sintered ceramic body in an amount of 0.05-5 weight percent. Alternatively, AlON powder can be added in the desired amount to the powder mixture during green forming.

As set forth herein, sintered ceramic bodies can comprise multiple components. Table IV summarizes required and optional components for sintered ceramic bodies covered in this Section I. Specific amounts of required and optional components are provided above.

TABLE IV

| Required and Optional Components | |
|---|---|
| Required | Optional |
| WC | Oxide component including rare-earth metal(s) |
| $W_2C$ | Zirconia |
| $Al_2O_3$ | Ti-compounds, Mo-compounds and/or (Ti, Mo)-compounds |
| | Additive component - Group VB carbide(s), chromium carbide |
| | AlON |

Sintered ceramic bodies having different required and optional components are described in following sections herein.

II. WC-Al$_2$O$_3$—(Ti,Mo)-Compound(s) Sintered Ceramic Bodies

In another aspect, sintered ceramic bodies are described herein comprising WC, alumina and one or more compounds including Ti and Mo (Ti,Mo). In some embodiments, a sintered ceramic body comprises 40-95 weight percent WC, 1-50 weight percent alumina and (Ti,Mo)-containing compound(s) in a total amount of 0.1-20 weight percent. Alumina content of the sintered ceramic body can also be selected from Table II herein. As described in Section I, various Ti-containing and/or Mo-containing powders can be incorporated into the body during green forming. Suitable powders include, but are not limited to, TiC, TiN, TiCN, MoC, MoO$_3$ and Mo metal. When sintered, (Ti,Mo)-containing carbides, nitrides, carbonitrides, oxycarbonitrides and/or oxides may be formed. Specific compositional identity of (Ti,Mo)-compound(s) in the sintered body is dependent on the powders employed in the green body. In some embodiments, for example, TiC, TiN and/or TiCN can be provided in the green body in amounts generally ranging from 0.5-5 weight percent, and Mo, MoC and/or MoO$_3$ can be provided in the green body in amounts of 0.5-20 weight percent. In some embodiments, Mo is present in the sintered ceramic body in an amount of 0.05-5 weight percent.

The sintered ceramic body can also include W$_2$C in addition to WC, alumina and Ti,Mo-containing compound(s). W$_2$C, in some embodiments, is present in the sintered ceramic body in an amount of at least 0.1 weight percent or in an amount selected from Table I herein. Additional optional components of the sintered ceramic body include zirconia such as YSZ, AlON, an oxide component including one or more rare-earth elements, and/or an additive component including one or more Group VB metal carbides and/or chromium carbide. Specific amounts of these optional components in the sintered ceramic body are described in Section I herein. Table V summarizes required and optional components for sintered ceramic bodies covered in this Section II.

TABLE V

Required and Optional Components

| Required | Optional |
|---|---|
| WC | Oxide component including rare-earth metal(s) |
| Al$_2$O$_3$ | Zirconia |
| | W$_2$C |
| (Ti, Mo)-containing compound(s) | AlON |
| | Additive component - Group VB carbide(s), chromium carbide |

III. WC-AlON Sintered Ceramic Bodies

In another aspect, sintered ceramic bodies are described herein comprising WC in an amount of 40-99.9 weight percent and AlON. In some embodiments, AlON is present in the sintered ceramic body in an amount of 0.1 to 50 weight percent. AlON content in the sintered ceramic body can also be selected from Table VI.

TABLE VI

AlON Content (wt. %)

0.5-25
1-15
2-10
10-25
1-40
1-30

As described herein, AlN can be added to the powder mixture during green forming. During sintering of the powder mixture, AlN is partially or fully converted to AlON. Sintering can be administered in a nitrogen atmosphere to facilitate formation of the AlON phase. Moreover, oxygen can be provided by one or more components of the powder mixture. For example, oxygen can derive from alumina and/or other oxides in the powder mixture. When partially converted to AlON, AlN can remain a component of the sintered ceramic body. In some embodiments, AlN is present in the sintered ceramic body in an amount of 0.05-5 weight percent. Alternatively, AlON powder can be added in the desired amount to the powder mixture during green forming.

The sintered ceramic body can also include W$_2$C in addition to WC and AlON. W$_2$C, in some embodiments, is present in the sintered ceramic body in an amount of at least 0.1 weight percent or in an amount selected from Table I herein. Additional optional components of the sintered ceramic body include alumina, zirconia such as YSZ, (Ti, Mo)-containing compounds, an oxide component including one or more rare-earth elements and/or an additive component including one or more Group VB metal carbides and/or chromium carbide. Specific amounts of these optional components in the sintered ceramic body are described in Section I herein. Table VII summarizes required and optional components for sintered ceramic bodies covered in this Section III.

TABLE VII

Required and Optional Components

| Required | Optional |
|---|---|
| WC | Oxide component including rare-earth metal(s) |
| AlON | Zirconia |
| | Alumina |
| | Additive component - Group VB carbide(s), chromium carbide |
| | W$_2$C |
| | Ti-containing compounds |
| | Mo-containing compounds |
| | (Ti, Mo)-containing compounds |
| | AlN |

FIG. 1 is an XRD of a sintered ceramic body comprising WC and AlON according to one embodiment described herein.

Sintered ceramic bodies described in Sections I-III herein can exhibit desirable properties for metal cutting applications, including high hardness, elastic modulus and suitable fracture toughness. In some embodiments, for example, sintered ceramic bodies have hardness of at least 18 GPa. Sintered ceramic bodies can also have hardness ranging from 18-25 GPa or 19-23 GPa. Hardness values recited herein were determined from Vickers indentation testing conducted with an Armstrongs Vickers hardness tester under the load of 18.5 kg in accordance with ASTM C1327-15. Moreover, sintered ceramic bodies of composition described herein can have elastic modulus (E) of 430-500 GPa. In some embodiments, the sintered ceramic bodies have elastic modulus of 450-500 GPa.

In addition to hardness and elastic modulus, sintered ceramic bodies described in Sections I-III can have fracture toughness ($K_{1c}$) of at least 4.0 MPam$^{0.5}$. In some embodiments, the sintered ceramic bodies have $K_{1c}$ of 4-6 MPam$^{0.5}$. Fracture toughness of the sintered ceramic bodies is determined using the direct indentation crack method and calculated per Anstis' equation [See, G. R. Anstis, P. Chantikul, B. R. Lawn, D. B. Marshall, A Critical Evaluation of Indentation Techniques for Measuring Fracture Toughness: I, Direct Crack Measurements, *Journal of the American Chemical Society*, Vol. 64, No. 9, pp. 533-538 (1981)].

The sintered ceramic bodies can have a fine average grain size, generally ranging from 0.5 µm to 5 µm. In some embodiments, the sintered ceramic bodies have an average grain size of 0.5 µm to 1.5 µm. Further, sintered ceramic bodies can be fully dense or substantially fully dense.

Sintered ceramic bodies described herein can generally be fabricated by weighing component powders in the desired amount and intimately mixing the powders via milling. The intimately mixed powder composition is provided to a mold for hot-press sintering. The mold can have any desired shape. As sintered ceramic bodies described herein are suitable for metal cutting applications, the mold can have the shape of a cutting tool, such as a cutting insert. Sintered ceramic bodies described herein can have any ANSI or ISO cutting insert geometry. In additional embodiments, sintered ceramic bodies may also be rotary cutting tools such as end mills or drills.

Hot-press sintering is generally administered for a time period of 45-120 minutes at temperature of 1600° C.–1800° C. and pressure of 20-50 MPa. Sintering atmosphere can be argon and/or other inert gas. Alternatively, nitrogen can be included in the sintering atmosphere to facilitate AlON formation as described herein. The hot pressed ceramics can optionally be further hot isostatic pressed in the temperature range of 1600° C.–1800° C. and pressure of 100-300 MPa to eliminate or reduce residual porosity.

These and other embodiments are further illustrated in the following non-limited examples.

Example 1—Sintered Ceramic Bodies

Figure 2:
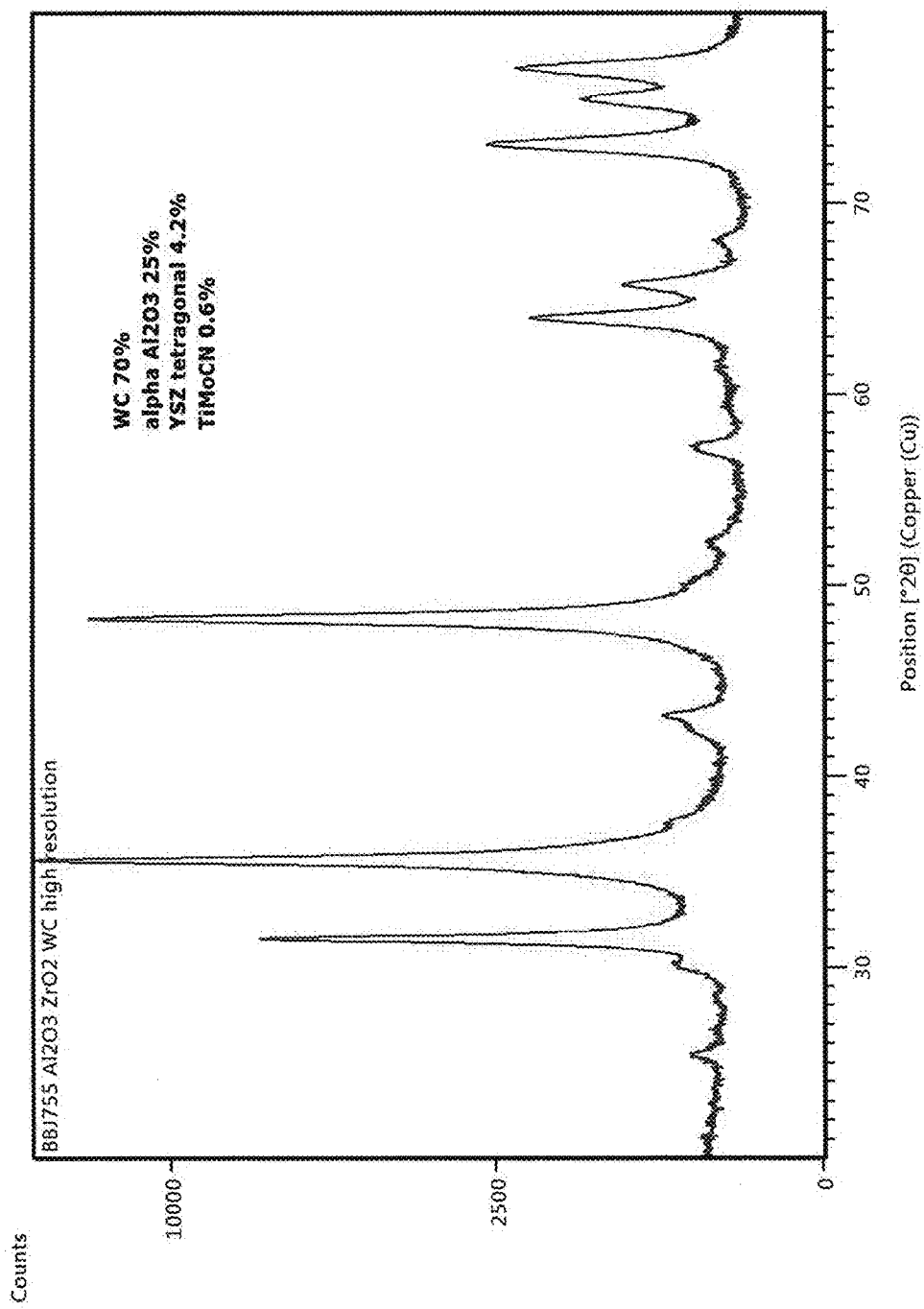
FIG. 2 is an XRD of a sintered ceramic body according to one embodiment described herein.
Figure 3:
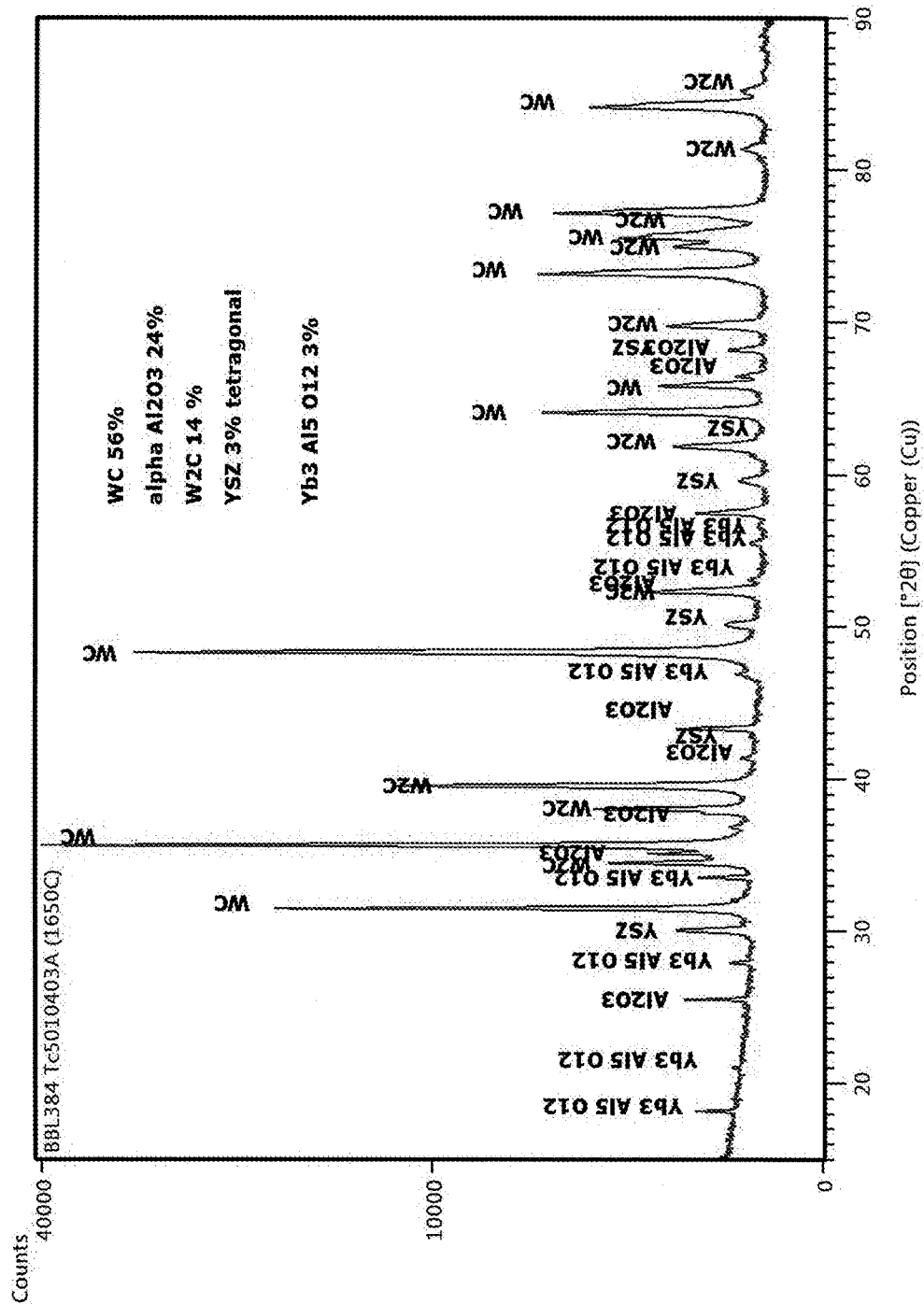
FIG. 3 is an XRD of a sintered ceramic body according to one embodiment described herein.

Sintered ceramic bodies 1 and 2 having composition described herein were produced by weighing component powders in the desired amount and intimately mixing the powders via milling. The intimately mixed powder compositions were each provided to a mold and hot-press sintered into cutting inserts of ANSI geometry RNG45E with hone radius in the range of 60-100 µm. Hot-press sintering was conducted in an argon atmosphere for a time period of 60 minutes at 1750° C. and pressure of 25 MPa with further hot isostatic pressing at 1700° C. and pressure of 200 MPa. Compositional parameters of sintered ceramic bodies 1 and 2 are provided in Table VIII. XRDs of Samples 1 and 2 are provided in FIGS. 2 and 3 respectively.

Elemental compositions of Samples 1 and 2 are provided in Table IX. Elemental analysis was conducted by XRF with the balance being carbon and oxygen.

TABLE IX

| | Elemental Composition (wt. %) | |
| --- | --- | --- |
| Element | Sample 1 | Sample 2 |
| Aluminum | 22.52 | 22.19 |
| Titanium | 0.27 | 0.021 |
| Vanadium | 0.21 | 0.15 |
| Chromium | 0.25 | 0.017 |
| Yttrium | 0.16 | 0.09 |
| Zirconium | 2.16 | 1.43 |
| Molybdenum | 0.14 | 4.54 |
| Tungsten | 57.82 | 54.03 |
| Cobalt | — | 0.049 |
| Ytterbium | — | 1.71 |

Figure 4:
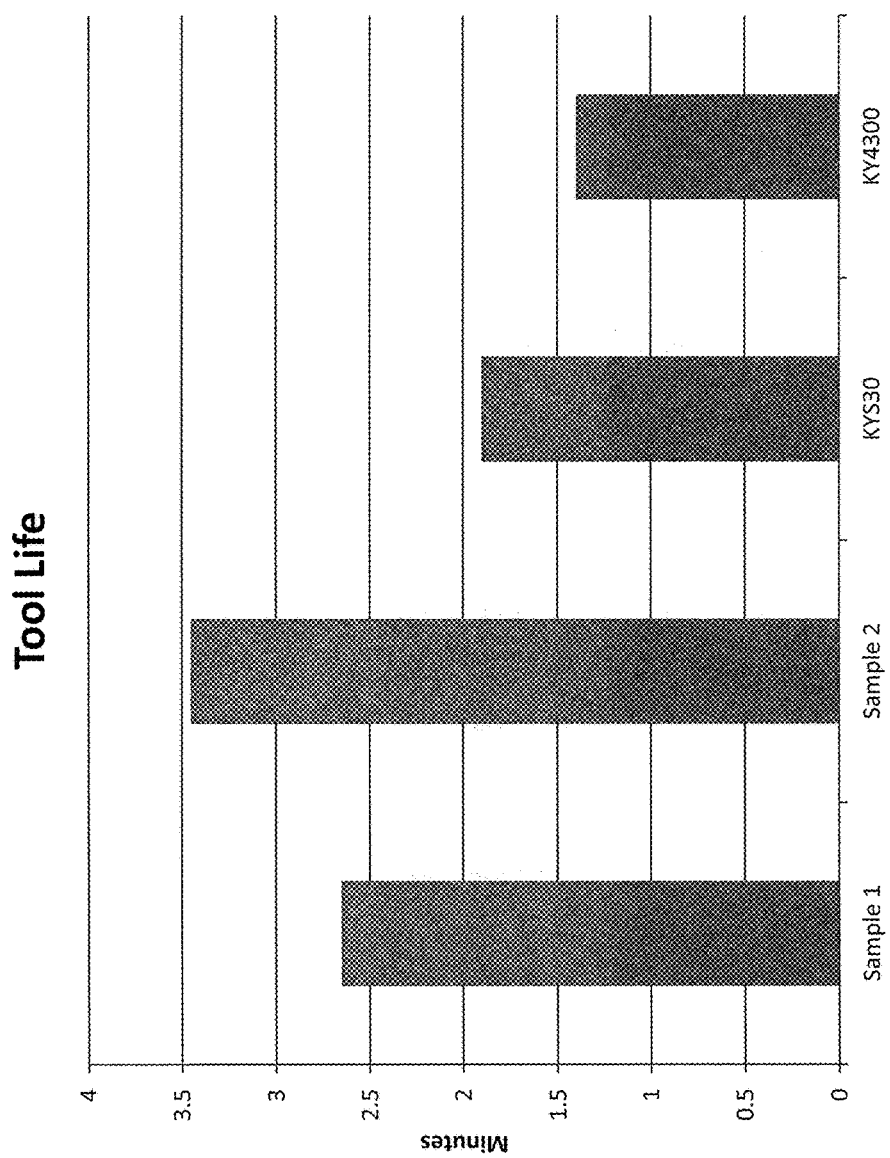
FIG. 4 illustrates metal cutting results of sintered ceramic bodies described herein relative to comparative sintered ceramic bodies.

Samples 1 and 2 were subjected to metal cutting testing under the following conditions:
Workpiece—ME16
Cutting Speed—700 sfm
Feed—0.007 ipr
Depth of Cut—0.070 inch
Comparative sintered ceramic grades of KYS30 and KY4300 commercially available from Kennametal Inc. were also subjected to the metal cutting testing. Results of the metal cutting testing are provided in FIG. 4. As illustrated in FIG. 4, sintered ceramic bodies of Sample 1 and Sample 2, having compositions and properties described herein, demonstrated significant increases in cutting lifetime in comparison to prior grades KYS30 and KY4300.

Example 2—Metal Cutting Testing

Figure 5:
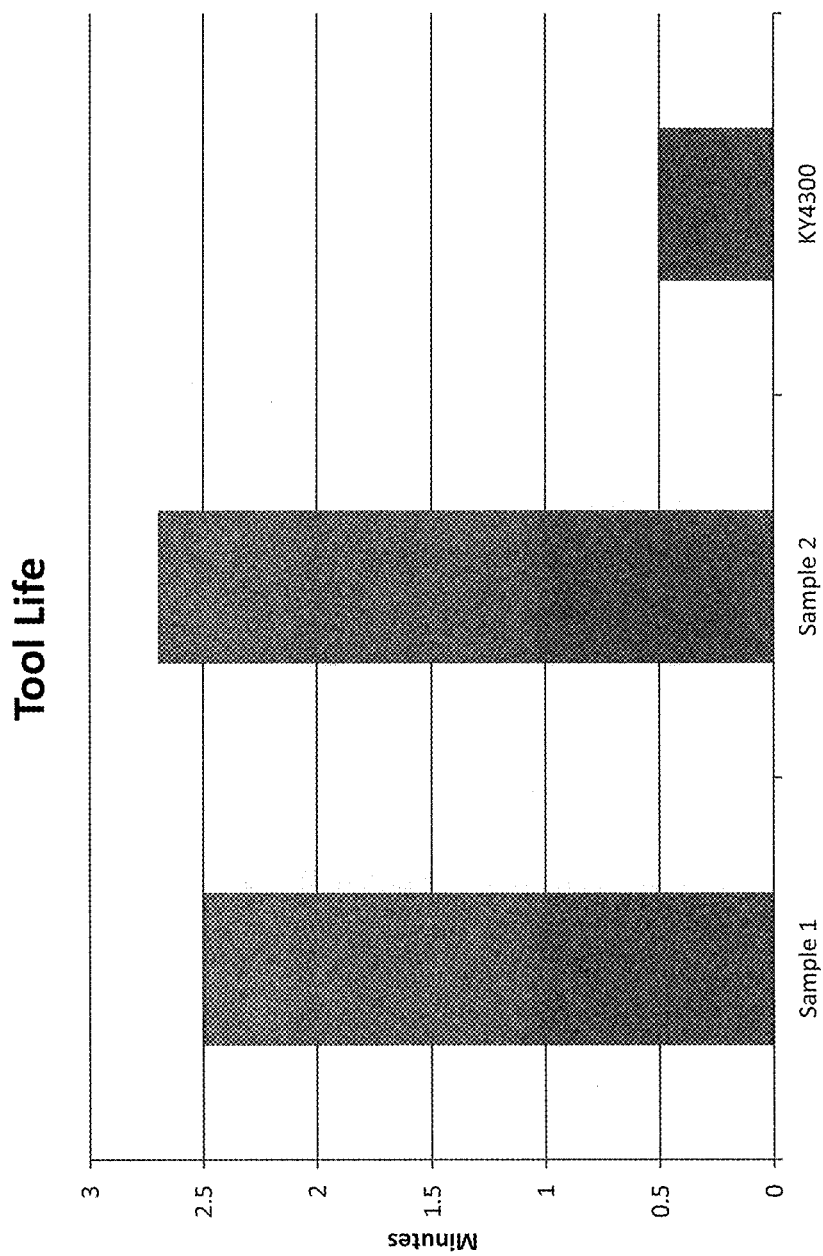
FIG. 5 illustrates metal cutting results of sintered ceramic bodies described herein relative to comparative sintered ceramic bodies.

Cutting inserts having composition and geometry of Samples 1 and 2 were prepared in accordance with Example 1. Samples 1 and 2 were subjected to metal cutting testing under the following conditions:
Workpiece—ME16
Cutting Speed—600 sfm
Feed—0.010 ipr
Depth of Cut—0.070 inch
Comparative sintered ceramic grade KY4300 commercially available from Kennametal Inc. was also subjected to the metal cutting testing. Results of the metal cutting testing are provided in FIG. 5. As illustrated in FIG. 5, Samples 1 and 2 exhibited significant increases in cutting lifetime in comparison to KY4300.

Example 3—Sintered Ceramic Body

Sintered ceramic body 3 having composition described herein was produced by weighing component powders in the desired amount and intimately mixing the powders via milling. The intimately mixed powder composition was

TABLE VIII

| | Sintered Ceramic Body Compositional Parameters (wt. %) | | | | | | |
| --- | --- | --- | --- | --- | --- | --- | --- |
| Sample | WC | W$_2$C | Al$_2$O$_3$ | AlON | AlN | Zirconia* | Yb$_3$Al$_{15}$O$_{12}$ | TiCN + Mo |
| 1 | 70 | — | 25 | — | — | 4.2 | — | 0.6 |
| 2 | 56 | 14 | 24 | — | — | 3 | 3 | — |

Figure 6:
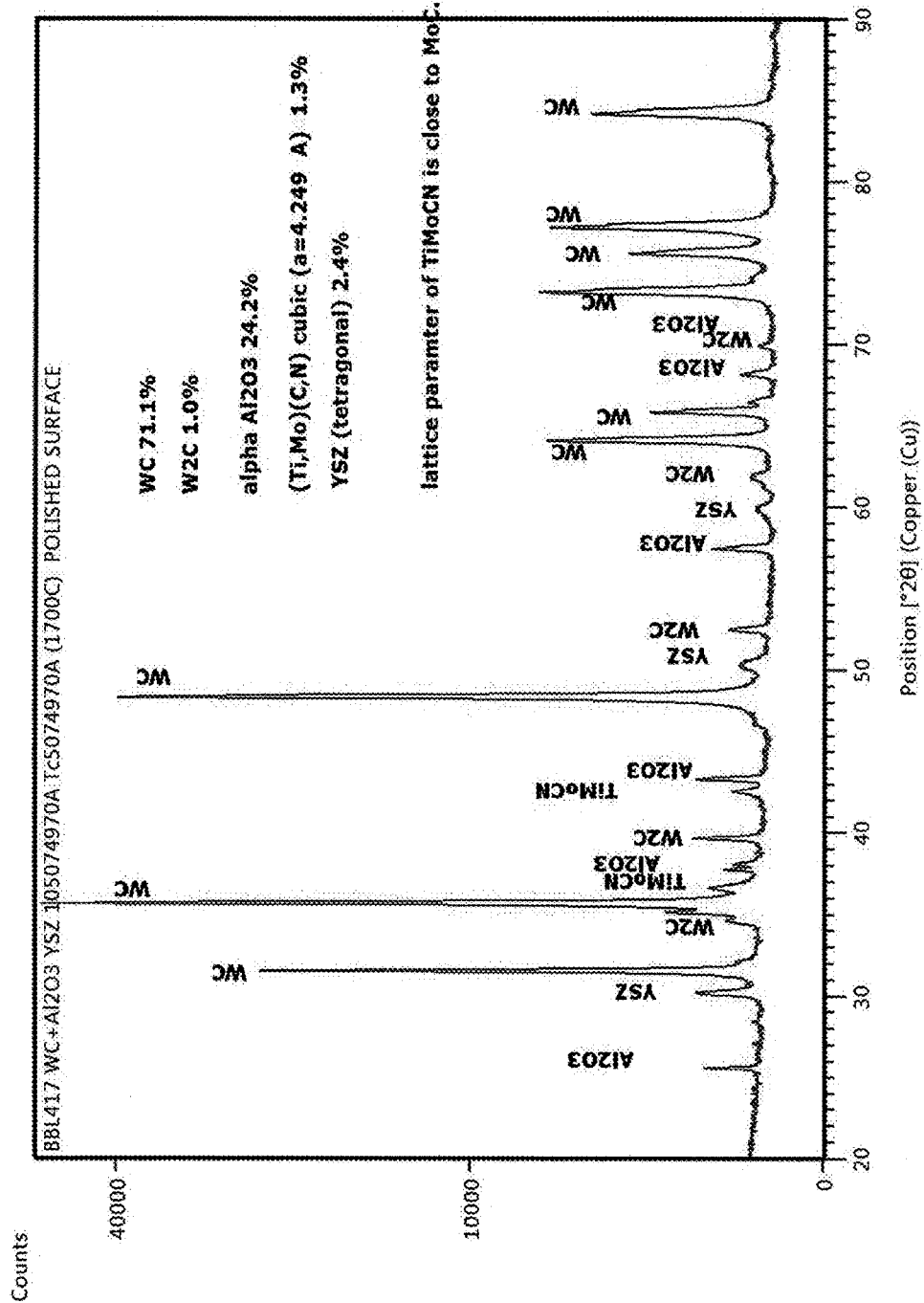
FIG. 6 is an XRD of a sintered ceramic body according to one embodiment described herein.

*yttria stabilized zirconia (YSZ)

provided to a mold and hot-press sintered into a cutting insert ANSI geometry RNG45E with hone radius in the range of 60-100 µm. Hot-press sintering was conducted in an argon atmosphere for a time period of 60 minutes at 1750° C. and pressure of 25 MPa with further hot isostatic pressing at 1700° C. and pressure of 200 MPa. Compositional parameters of sintered ceramic body 3 are provided in Table X. An XRD of Sample 3 is provided in FIG. 6.

TABLE X

Sintered Ceramic Body Compositional Parameters (wt. %)

| Sample | WC | $W_2C$ | $Al_2O_3$ | AlON | AlN | Zirconia* | $Yb_3Al_{15}O_{12}$ | TiCN + Mo |
|---|---|---|---|---|---|---|---|---|
| 3 | 71.1 | 1.0 | 24.2 | — | — | 2.4 | — | 1.3 |

*yttria stabilized zirconia (YSZ)

Elemental composition of Sample 3 is provided in Table XI. Elemental analysis was conducted by XRF with the balance being carbon and oxygen.

TABLE XI

Elemental Composition (wt. %)

| Element | Sample 3 |
|---|---|
| Aluminum | 14.49 |
| Titanium | 0.32 |
| Vanadium | 0.21 |
| Chromium | 0.014 |
| Yttrium | 0.17 |
| Zirconium | 2.61 |
| Molybdenum | 0.16 |
| Tungsten | 70.54 |
| Cobalt | — |
| Ytterbium | — |

Sample 3 was subjected to metal cutting testing under the following conditions:

Workpiece—ME16

Cutting Speed—600 sfm

Feed—0.010 ipr

Depth of Cut—0.070 inch

Figure 7:
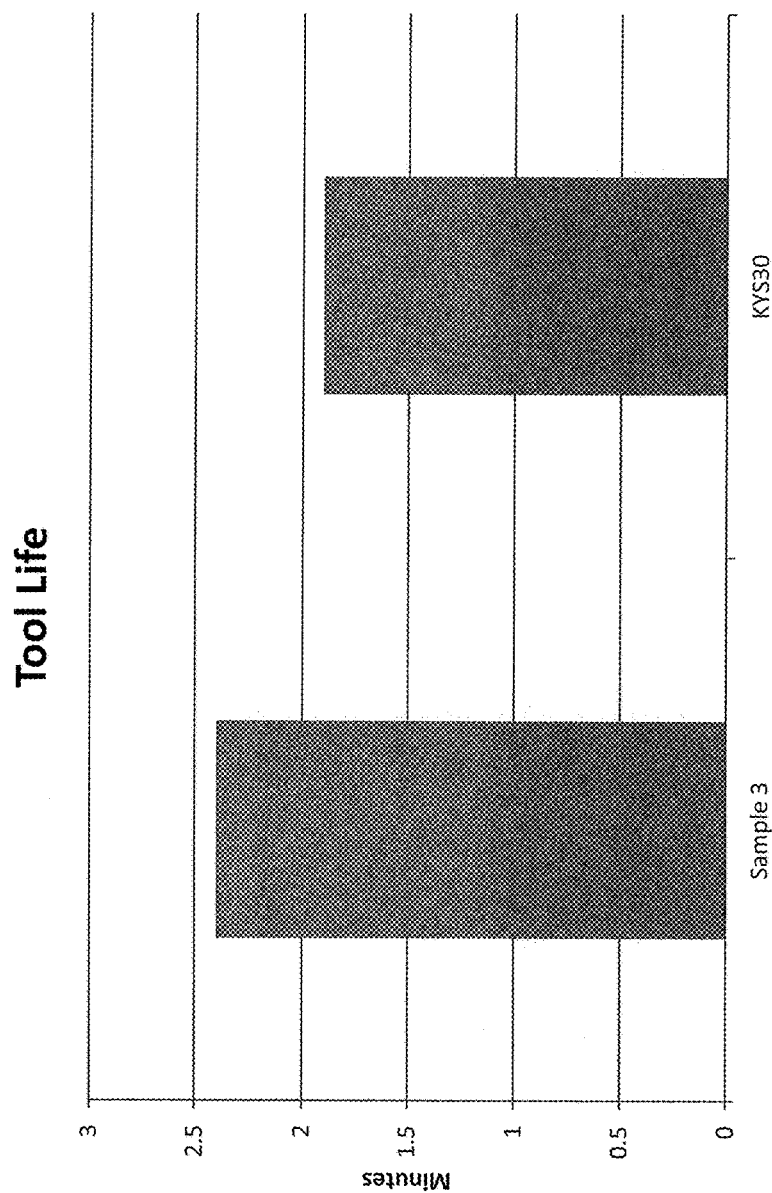
FIG. 7 illustrates metal cutting results of a sintered ceramic body described herein relative to a comparative sintered ceramic body.

Comparative sintered ceramic grade of KYS30 commercially available from Kennametal Inc. was also subjected to the metal cutting testing. Results of the metal cutting testing are provided in FIG. 7. As illustrated in FIG. 7, the sintered ceramic body of Sample 3, having composition and properties described herein, demonstrated a significant increase in cutting lifetime in comparison to prior grade KYS30.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A sintered ceramic body comprising:
tungsten carbide (WC) in an amount of 40-95 weight percent, alumina ($Al_2O_3$) in an amount of 1-40 weight percent and one or more compounds containing titanium (Ti) and (Mo), wherein the Mo is present in the sintered ceramic body in an amount of 0.05 to 1 weight percent.

2. The sintered ceramic body of claim 1, wherein the one or more (Ti,Mo)-containing compounds are present in a total amount of 0.1-20 weight percent.

3. The sintered cemented carbide composition of claim 1 further comprising ditungsten carbide ($W_2C$) in an amount of at least 1 weight percent.

4. The sintered ceramic body of claim 1, further comprising zirconia in an amount of 0.1-10 weight percent.

5. The sintered ceramic body of claim 1 further comprising an oxide component including one or more rare-earth elements.

6. The sintered ceramic body of claim 1 further comprising an additive component comprising one or more Group VB metal carbides, chromium carbide, ZrNbC or mixtures thereof.

* * * * *